Jan. 16, 1962 F. J. KOZACKA 3,017,558

SEMICONDUCTOR RECTIFIERS

Filed Oct. 27, 1958 2 Sheets-Sheet 1

Inventor:
Frederick J. Kozacka,
by [signature]
Attorney

Inventor:
Frederick J. Kozacka,
by [signature] Attorney 3,017,558
SEMICONDUCTOR RECTIFIERS
Frederick J. Kozacka, South Hampton, N.H., assignor to The Chase-Shawmut Company, Newburyport, Mass.
Filed Oct. 27, 1958, Ser. No. 769,789
3 Claims. (Cl. 321—14)

This invention is concerned with semiconductor rectifiers, and more particularly with the protection of such rectifiers against cell failure and external faults.

This application is a continuation-in-part of my copending patent application Ser. No. 658,162, filed May 9, 1957 for Current-Limiting Fuses With Increased Interrupting Capacity now U.S. Patent 2,866,038, and is concerned with the application of some of the teachings in the aforementioned patent application for the purpose of protecting semiconductor rectifiers against the effects of overcurrents.

It is one object of this invention to provide improved means for the protection of rectifiers comprising high-current-density semi-conductor rectifier cells such as, for instance, silicon cells, or germanium cells, which cells require instant interruption of their circuit in response to relatively small over-currents.

Rectifier bridge circuits comprise current-limiting fuses having a relatively small current-carrying capacity, say a few hundred amps., which are arranged in series with the rectifier cells to limit the flow of current resulting from cell failure. Such fuses, briefly referred to as cell fuses, may blow shortly before, or only after, a complete breakdown of one of the rectifier cells occurs.

Semiconductor rectifiers call for an additional protective means or fuse to clear external faults. Fuses provided for the purpose of clearing external faults may be briefly referred to as system fuses.

It is one of the objects of this invention to provide improved semiconductor rectifiers wherein the cell fuses and the system fuses operate selectively, i.e. wherein only cell fuses blow in response to impending or complete cell failure or cell breakdown, and wherein only the system fuses blow in response to external faults.

In order to prevent the fault current resulting from an external fault to cause blowing of the cell fuses, the fault current must be rigorously limited both as to magnitude and duration. Therefore the system fuses must be of the current-limiting type. Since the system fuses must have a high current-carrying capacity, their let-through current or clearing $\int i^2 \cdot dt$—i.e. the integral of the second power of the let-through current from fault inception to current zero—will tend to be high. System fuses must combine high current-carrying capacity with a low clearing $\int i^2 \cdot dt$ which are more or less incompatible requirements.

It is another object of the invention to provide semiconductor rectifiers having system fuses whose clearing $\int i^2 \cdot dt$ is small in spite of the large current-carrying capacity thereof.

The clearing $\int i^2 \cdot dt$ of a high current-carrying capacity current-limiting fuse can be minimized by provision therein of a large number of fusible elements, or fuse links, arranged in parallel in the circuit to be protected. This method has, however, its economic limits, and in many instances the method is not sufficiently effective in itself to maintain the clearing $\int i^2 \cdot dt$ of system fuses sufficiently small to preclude on occurrence of external faults simultaneous blowing of the system fuses and of the cell fuses.

It is, therefore, another object of this invention to provide semiconductor rectifiers the system fuses of which comprise simple and highly effective means for limiting the clearing $\int i^2 \cdot dt$ thereof to whatever extent is required to preclude simultaneous blowing of system fuses and cell fuses.

Further objects and advantages of the invention will become more apparent as the following description proceeds, and the features of novelty which characterize the invention will be pointed out with particularity in the claims annexed to, and forming part of, this specification.

For a better understanding of the invention reference may be had to the accompanying drawings wherein FIGS. 1–3 are diagrams of three different rectifier bridge circuits embodying the invention;

Figures 1, 2, 3:
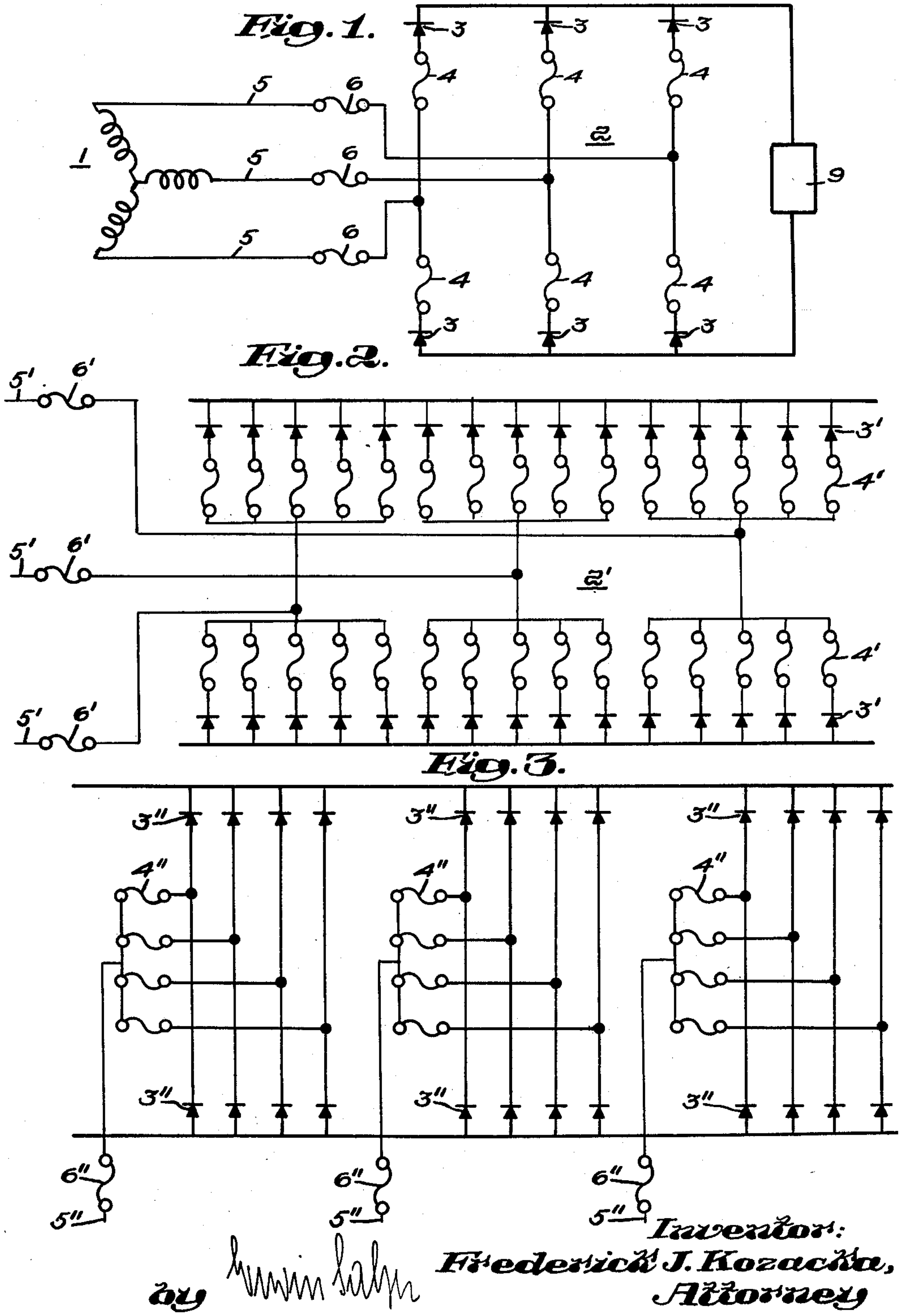

Referring now to the drawing, and more particularly to FIG. 1 thereof, numeral 1 has been applied to generally indicate the secondary windings of a Y connected transformer used as an A.-C. source, and numeral 2 has been applied to generally indicate a semiconductor rectifier bridge circuit including rectifier cells 3 and cell fuses 4. Each cell 3 has a predetermined current rating and the cell fuses 4 are designed to blow on currents in the order of 300 to 500 percent cell rating in one cycle, or less, of a current wave of 60 c.p.s. This speed requirement results from the particular nature of critical high-current-density semiconductor rectifier cells such as, for instance, germanium rectifier cells, or silicon rectifier cells. Leads 5 conductively connect secondary windings 1 to the bridge circuit 2 and the high current-carrying-capacity system fuses 6 are arranged in leads 5. The load 7 is arranged in the output or D.-C. circuit of the rectifier.

In FIG. 2 the same reference numerals with one prime sign added have been applied to indicate like parts as in FIG. 1, and therefore FIG. 2 is substantially self-explanatory.

In FIG. 3 the same reference numerals as in FIG. 1 with two prime signs added have been applied to indicate like parts as in FIG. 1 and therefore FIG. 3 is likewise substantially self-explanatory.

It will be apparent that FIGS. 2 and 3 differ from FIG. 1 inasmuch as in the latter several cells are connected in parallel in each leg of the rectifier, whereas in FIG. 1 cells are not paralleled. Arranging of a plurality of cells in parallel makes it possible to maintain continuity of services even though one of the cells becomes defective and the cell fuse which is arranged in series with the defective cell blows.

In the arrangement of FIGS. 1 and 2 the clearing $\int i^2 \cdot dt$ of each cell fuse 4 or 4′, respectively, should be less than the maximum permissible $\int i^2 \cdot dt$ rating of each cell 3 or 3′, respectively.

The arrangement of FIG. 2 might be modified by connecting several, say *n*, rectifier cells 3′ in parallel with one another and by providing a common serially connected cell fuse for all the cells in parallel. In that case the clearing $\int i^2 dt$ of the cell fuse should not exceed $n^2$ times the maximum permissible $\int i^2 dt$ rating of the cells which are conencted in parallel. If the cells in parallel do not equally share their current-carrying duty, inequalities in current sharing must be taken into account.

In the circuit shown in FIG. 3 groups of four cells 3″ are connected in parallel and each cell fuse 4″ is arranged in the circuit of two semiconductor rectifier cells 3″ which are not connected in parallel.

While FIGS. 1–3, inclusive, refer to three-phase bridge circuits, the invention is not limited to bridge circuits having three phases.

Referring now to FIG. 1, if one of the cells 3 breaks down, its serially related cell fuse 4 must blow but the system fuses 6 should not blow. If there is a short-circuit in the system as a result of which two of the system fuses 6 blow, the cell fuses 4 must not be caused to blow by the let-through current of the system fuses 6. In order to achieve this end the fusing $\int i^2 \cdot dt$ of cell fuses 4 must never be allowed to be exceeded on blowing of system fuses 6. There is a fixed relation between the clearing $\int i^2 \cdot dt$ of the system fuses, and the portion of that clearing $\int i^2 \cdot dt$ to which the cell fuses are subjected. This relation varies from circuit to circuit, but is always fixed. Hence, where the fusing $\int i^2 \cdot dt$ of the cell fuses is given, it is always possible to calculate the maximum permissible clearing $\int i^2 \cdot dt$ of the system fuses, i.e. the maximum value of that quantity which does not result in undesired and unnecessary blowing of the cell fuses.

Figures 4, 5, 6:
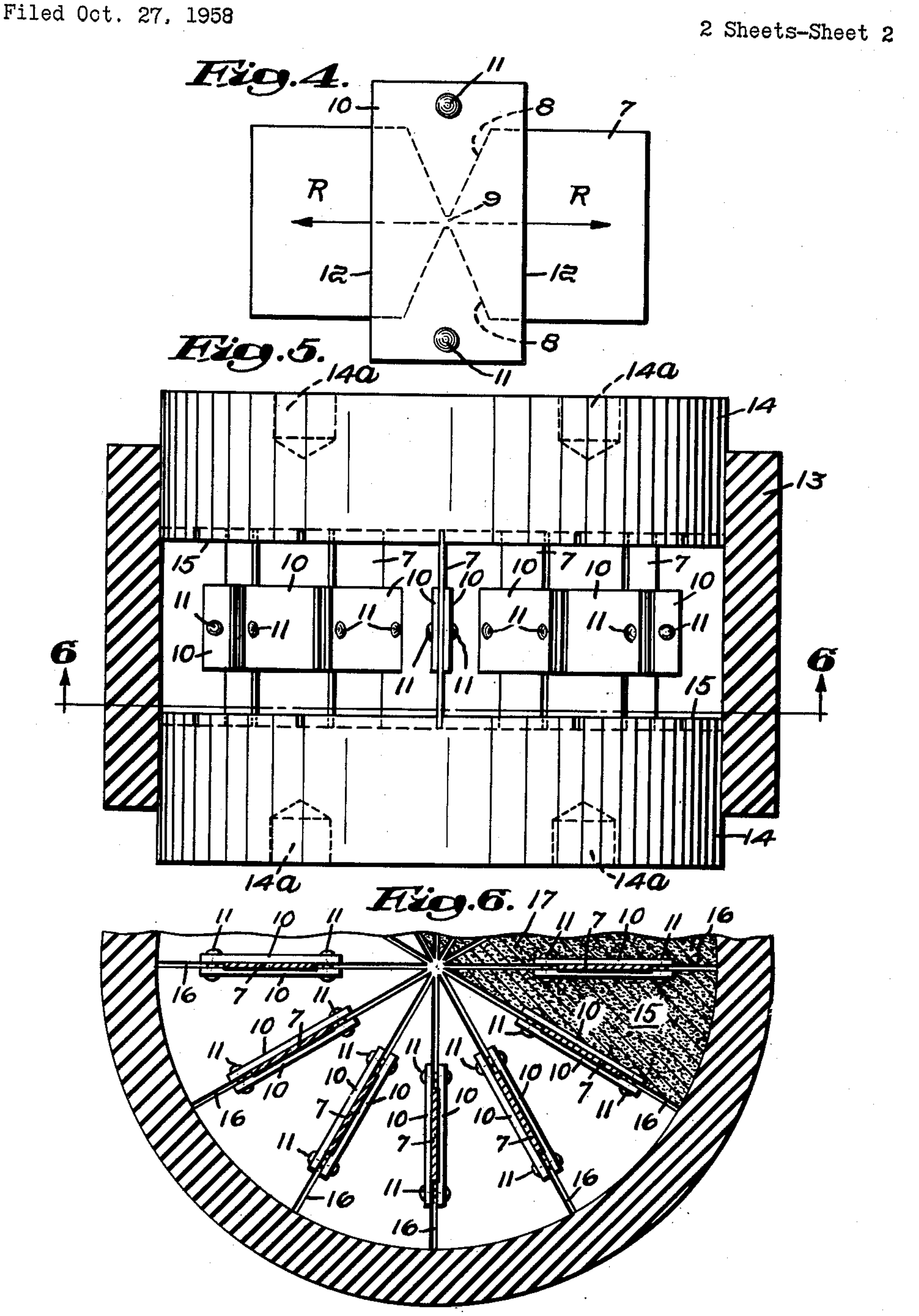
FIG. 4 is a side elevation of a fusible element or fuse link associated with a pair of insulating barriers limiting the value of the clearing $\int i^2 \cdot dt$.
FIG. 5 is in part a section and in part a front view of a system fuse embodying the invention showing the fuse upon removal of the pulverulent arc-quenching filler normally filling the casing thereof.
FIG. 6 is a section along 6—6 of FIG. 1 showing the fuse upon removal from its casing of most of the pulverulent arc-quenching filler which is normally inside of the casing.

The unit structure of a fusible element of a system fuse 6, 6' or 6'' which is shown in FIG. 4 comprises a silver ribbon 7 having two lateral V-shaped incisions 8 defining therebetween a narrow neck or bridge 9. Bridge 9 is very short and simulates a point-heat-source when silver ribbon 7 carries an electric current. Ribbon 7, and more particularly bridge 9 thereof, are sandwiched between a pair of plates 10 which are fairly heat resistant and should have as high a heat absorbing capacity as possible. In order to limit the maximum temperature to which plates 10 may be subjected, ribbon 7 may be tin-plated. Tin-plating of ribbon 7 results in corrosion of bridge 9 when the fusing point of the tin is reached, and thus precludes plates 10 from ever being subjected to a temperature in excess of the fusing point of tin, except when bridge 9 is being destroyed by corrosion and an electric arc bridges the gap formerly spanned by bridge 9. In order to achieve a high heat absorbing capacity plates 10 are preferably made of a synthetic-resin-glass-cloth laminate, the high latent heat of fusion of the glass-cloth component imparting to such a laminate the desired high heat absorbing capacity. Plates 10 are joined together by a pair of rivets 11 arranged in a line at right angles to the longitudinal axis of ribbon 7 and intersecting ribbon 7 at the point where its neck, bridge, or point of reduced cross-section, is located. When bridge 9 is destroyed by the action of an overcurrent, an arc is kindled between the then separated ends of ribbon 7. The pressure generated by the arc tends to produce blasts of gas. Since the rectangular plates 10 are tightly clamped together by rivets 11 at their narrow sides, the resistance against the transverse outflow of products of arcing is relatively high, and such an outflow is substantially inhibited. The products of arcing are relatively free to escape from the arcing zone in directions substantially longitudinally of current-carrying ribbon 7, i.e. they escape preponderantly in the direction of arrows R. Their ready escape in this direction is made possible on account of the fact that plates 10 are resilient and that the longer edges 12 of plates 10 may slightly bend outwardly, i.e. in opposite directions out of the plan of the paper. Then plates 10 form two flaring arc-chutes which direct the outward flow of hot gases to the residue of ribbon 7. The residual portions of ribbon 7 then operate as cooling means for the hot products of arcing sweeping over them. Normally the two arc chutes formed by plates 10 and rivets 11 are closed. The length of plates 10 exceeds the maximum burn-back length of ribbon 7, and therefore the arc terminals formed on ribbon 7 never move out of the space encompassed by plates 10. Ribbon 7 and plates 10 are submersed in a pulverulent fulgurite-forming, arc-quenching filler (not shown in FIG. 4) such as quartz sand. The filler is substantially separated from the arcing zone by the plates 7, and since the length of plates 10 exceeds the maximum burn-back length of silver ribbon 7, the arc terminals never move into the fulgurite-forming filler. This precludes the formation of fulgurites which bridge the arc-gap formed between the separated ends of ribbon 7. The blast of hot arc products escaping through the open arc chutes formed by plates 10 and rivets 11 form fulgurites where the arc products sweep into the filler of the fuse, i.e. along the edges 12 of plates 10. The fulgurites formed at these points do not bridge the arc gap and are thus relatively harmless. In other words, these fulgurites do not result in a significant follow current, or post arc extinction current, tending to increase clearing $\int i^2 \cdot dt$ values.

FIGS. 5 and 6 show a complete system fuse made up of units of the kind shown in FIG. 4. The structure shown in FIGS. 5 and 6 comprises a tubular casing closed on both ends by metal plugs 14. Plugs 14 are provided with screw-threaded recesses 14a adapted to receive screws for connecting the fuse into the A.-C. leads of the rectifier which leads are indicated in FIGS. 1–3 by the reference characters 5, 5' and 5'', respectively. Preferably plugs 14 are held in casing 13 by a plurality of angularly displaced steel pins (not shown). The axially inner surfaces 15 of plugs 14 are provided with registering systems of radial grooves 16. Each juxtaposed pair of such grooves 16 receives a unit of the kind shown in FIG. 4 comprising a silver ribbon 7, a pair of plates 10 and a pair of rivets 11. When the system fuse structure shown in FIGS. 5 and 6 is completely assembled casing 13 is being filled with quartz sand or an equivalent pulverulent arc-quenching filler indicated in FIG. 6 by reference character 17. This may be achieved by providing a filling hole (not shown) in one of plugs 14, or by initially forming an annular filling gap between the upper plug 14 and casing 13, which gap is being closed when casing 13 is moved to its final position shown.

As long as all cell fuses connected in parallel equally share in their current-carrying duty, the clearing $\int i^2 \cdot dt$ of the system fuse will likewise be equally apportioned between the cell fuses. Corrections well known in the art must be adopted where cell fuses connected in parallel do not equally share in their current-carrying duty.

Although this invention has been described in considerable detail, it is to be understood that such description is illustrative rather than limiting, as the invention may be variously embodied, and is to be interpreted as claimed.

I claim:

1. A semiconductor rectifier comprising a polyphase A.-C. source, a rectifier circuit including high current density semiconductor rectifier cells, a plurality of said cells being connected in parallel in each phase of said polyphase circuit, leads carrying A.-C. currents conductively connecting said source to said rectifier circuit, a plurality of current-limiting cell fuses having a relatively small current-carrying capacity arranged in said rectifier circuit each in series with one of said cells to limit the flow of current resulting from failure of each of said cells, current-limiting fuse means having a relatively large current-carrying capacity arranged in said leads, said fuse means having a predetermined clearing $\int i^2 \cdot dt$ sufficiently small to cause selective operation thereof on occurrence of external faults, and said fuse means including an insulating casing, a pulverulent arc-quenching fulgurite-forming filler in said casing, a plurality of fusible elements each having an arc-gap-forming point of reduced cross-section submersed in said filler and a plurality of insulating barrier means separating each of said plurality of elements means from said filler, said plurality of barrier means being adapted to inhibit formation of arc-gap-bridging fulgurites on blowing of said fuse means.

2. A semiconductor rectifier comprising a polyphase A.-C. source, a bridge circuit including high current density semiconductor rectifier cells, a plurality of cells being connected in parallel in each leg of said bridge circuit, leads carrying A.-C. currents conductively connecting said source to said bridge current, a plurality of current limiting fuses having a relatively small current-carrying capacity arranged in said bridge circuit each in series with one of said cells to limit the flow of current resulting from failure of each of said cells, current-limiting fuse means having a relatively large current-carrying capacity arranged in said leads, said fuse means having a predetermined clearing $\int i^2 \cdot dt$ sufficiently small to cause selective operation thereof on occurrence of external faults, and said fuse means including an insulating casing, a quartz sand filler in said casing, a plurality of ribbon fuse links of silver submersed in said filler each having at least one point of reduced cross-section, and pairs of barriers of a synthetic-resin-glass-cloth laminate supported by said a plurality of fuse links and sandwiching said point of reduced cross-section.

3. A semiconductor rectifier comprising a polyphase A.-C. source, a bridge circuit including high current density semiconductor rectifier cells, a plurality of said cells being connected in parallel in each leg of said bridge circuit, leads carrying A.-C. currents conductively connecting said source to said bridge circuit, a plurality of current-limiting fuses having a relatively small current-carrying capacity arranged in said bridge circuit each in series with one of said cells to limit the flow of current resulting from cell failure, current-limiting fuse means having a relatively large current-carrying capacity arranged in said leads, said fuse means having a predetermined clearing $\int i^2 \cdot dt$ sufficiently small to cause selective operation thereof on occurrence of external faults, and said fuse means including an insulating casing, a quartz sand filler in said casing, a plurality of spaced ribbon fuse links of silver submersed in said filler each having at least one point of reduced cross-section, a plurality of normally closed arc-chute structures each mounted on one of said plurality of fuse links over said point of reduced cross-section thereof substantially separating said point of reduced cross-section from said filler, and said plurality of arc chute structures comprising resilient means adapted to yield and open under the action of the pressure of products of arcing and then to release products of arcing into said filler preponderantly in directions longitudinally of said plurality of links.

References Cited in the file of this patent

UNITED STATES PATENTS

| | | |
|---|---|---|
| 1,846,895 | Muller | Feb. 23, 1932 |
| 2,390,005 | Siefert et al. | Nov. 27, 1945 |
| 2,439,165 | Graves | Apr. 6, 1948 |
| 2,813,243 | Christian et al. | Nov. 12, 1957 |
| 2,866,038 | Kozacka | Dec. 23, 1958 |